United States Patent [19]

Enters

[11] 4,074,764
[45] Feb. 21, 1978

[54] TILLER

[75] Inventor: Edward W. Enters, Fredonia, Wis.

[73] Assignee: Gilson Brothers Company, Plymouth, Wis.

[21] Appl. No.: 660,128

[22] Filed: Feb. 23, 1976

[51] Int. Cl.² ............................................. A01B 33/02
[52] U.S. Cl. ........................................ 172/42; 172/776
[58] Field of Search .................... 172/42, 43, 15, 17, 172/776; 180/19, 58

[56] References Cited

U.S. PATENT DOCUMENTS

| 1,325,244 | 12/1919 | Galardi et al. | 180/19 R UX |
| 2,085,312 | 6/1937 | Gourley | 180/19 R |
| 2,200,921 | 5/1940 | Granell | 172/42 UX |
| 2,203,735 | 6/1940 | Mack | 180/19 R |
| 2,903,077 | 9/1959 | Kamlukin | 172/42 |
| 3,040,590 | 6/1962 | Smithburn | 172/42 X |
| 3,057,412 | 10/1962 | Hovis, Jr. | 172/42 |
| 3,180,428 | 4/1965 | Price | 172/42 |
| 3,658,135 | 4/1972 | Thompson | 172/42 |

Primary Examiner—Paul E. Shapiro

[57] ABSTRACT

A horizontal extension of a tiller frame supports the engine, gear box, and tine assembly of a tiller. The tiller frame has a portion which defines the tiller handle and includes a one-piece, forked end which provides the horizontal extension and, in addition, provides a generally vertical extension which supports the tiller wheels. At its forked end the tiller frame is generally delta-shaped having a broad, web-like portion extending between and integral with the horizontal and vertical frame extensions and arranged in a vertical plane.

8 Claims, 5 Drawing Figures

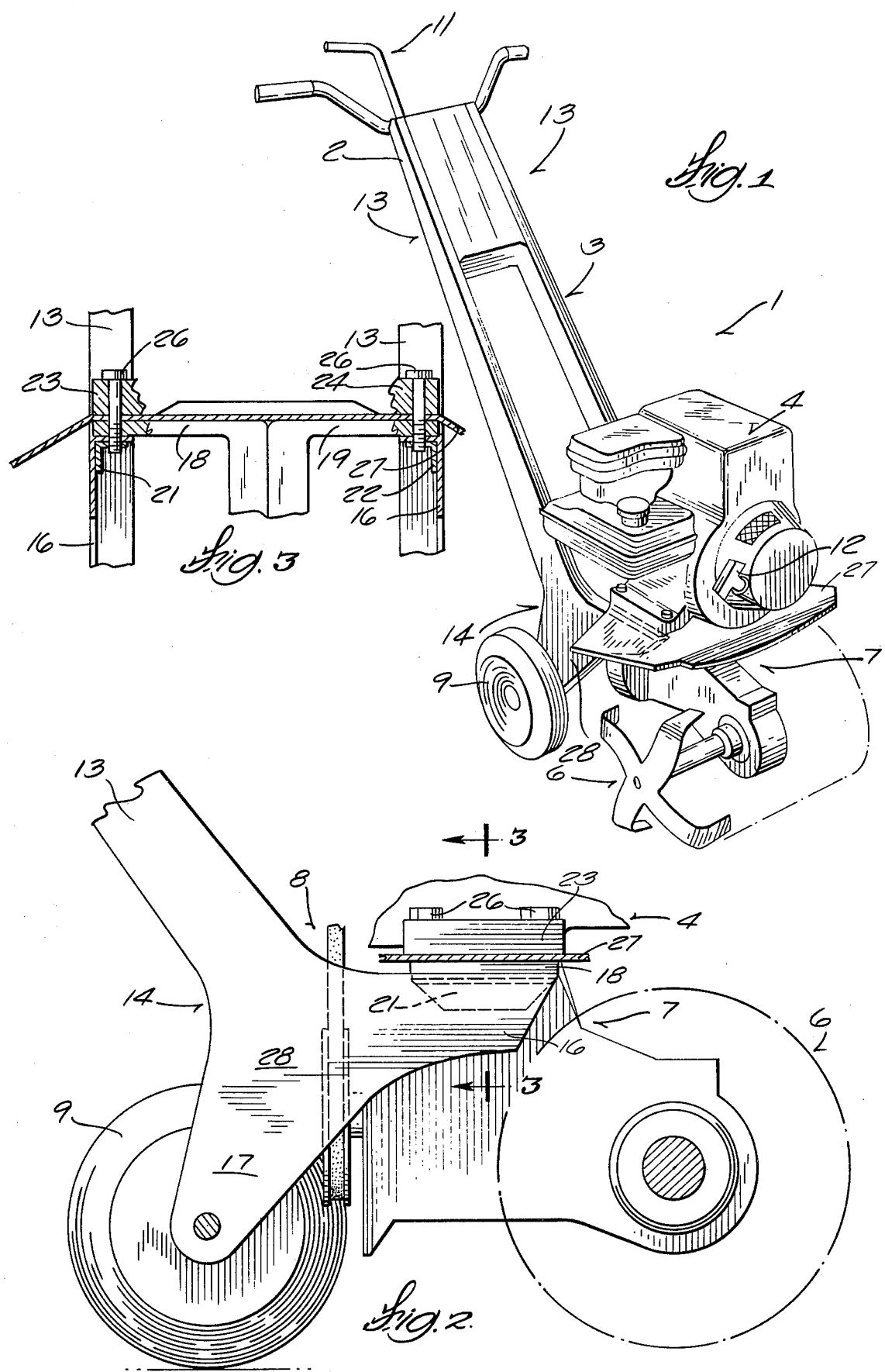

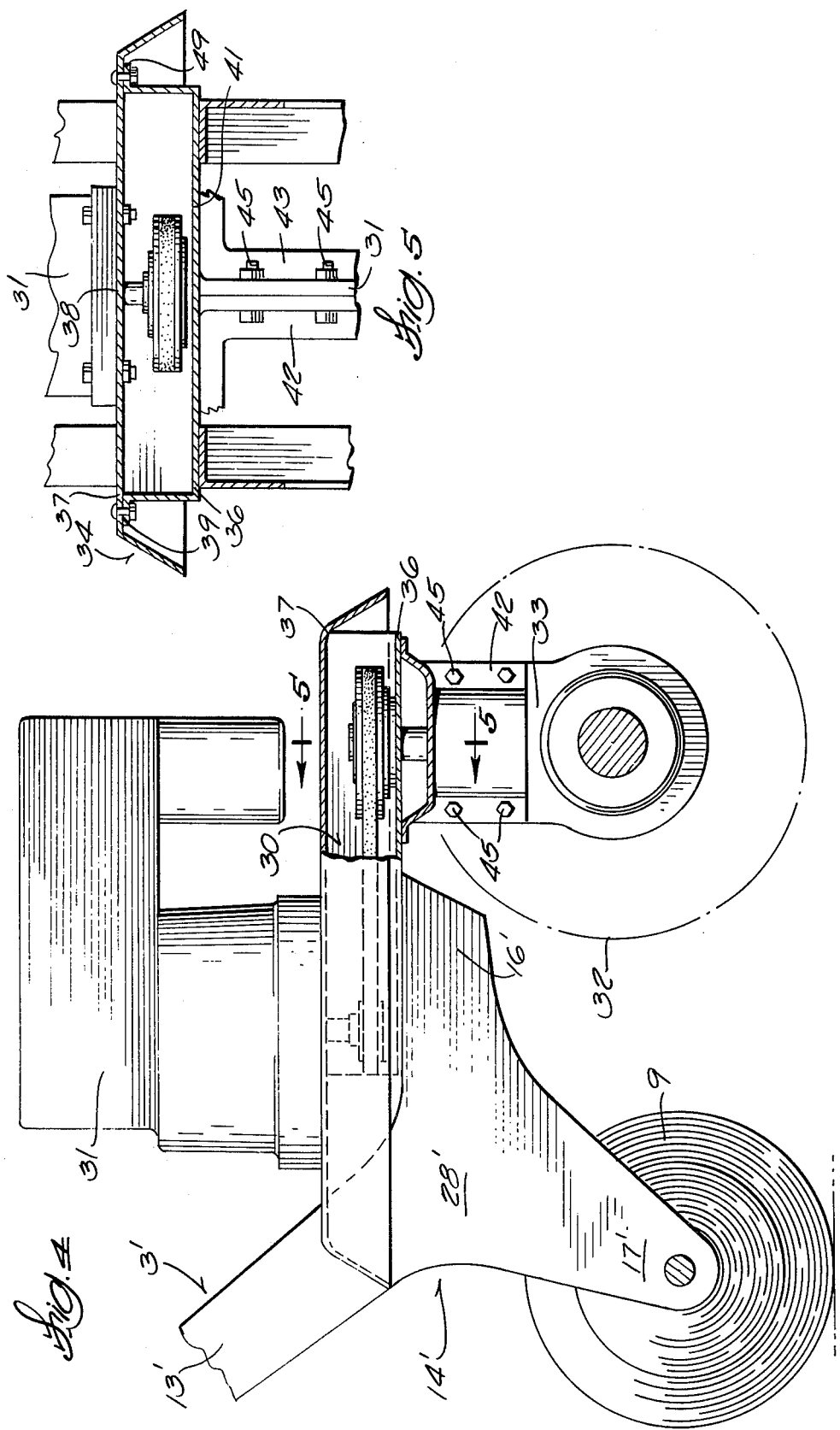

TILLER

BACKGROUND OF THE INVENTION

This invention relates to tillers and, more particularly, to a construction which permits a substantial reduction in the tiller size.

Power tillers are old and well known but heretofore have tended to be relatively large, cumbersome, and complex in construction and, as a result, relatively high priced. This has generally placed the heretofore available tillers out of the practical reach of the homeowner and/or casual amateur gardener.

This invention is concerned with that particular deficiency in the tiller market and has among its general objects to provide a tiller which is relatively simple in construction, relatively lightweight and within the practical reach of the homeowner and/or casual amateur gardener and all without sacrificing basic operating effectiveness, reliability, and safety.

SUMMARY OF THE INVENTION

For the achievement of these and other objects, this invention proposes a tiller wherein the frame thereof has a vertically extending handle portion and a forked end defining a generally horizontal leg and a generally vertical leg. An engine, gear box, and tine assembly are supported from the horizontal leg of the frame in a manner which transmits the load of those three subassemblies to the horizontal leg.

Preferably, the gear box includes a flange which is sandwiched between the engine flange and the horizontal frame leg to thereby result in a relatively compact arrangement requiring a minimum number of basic parts.

Also, the frame is preferably characterized in that the forked end includes a planar web portion which extends between and is generally integral with the horizontal and vertical legs. The web portion forms the juncture between those legs attributing a generally delta-shape to the forked end. The web is disposed in a vertical plane and attributes relatively higher load carrying characteristics to the horizontal leg extension of the forked end.

Also, in a preferred embodiment, the tiller frame is actually made up of two similar sections each having a forked and defining horizontal and vertical leg extensions and having the vertical web at the juncture between those leg extensions.

Other objects and advantages will be pointed out in, or be apparent from, the specification and claims, as will obvious modifications of the embodiments shown in the drawings, in which:

FIG. 1 is a perspective view of a tiller embodying this invention;

FIG. 2 is a side elevation of a portion of the tiller of FIG. 1;

FIG. 3 is a section view taken generally along line 3—3 of FIG. 2;

FIG. 4 is a side elevation of an alternative embodiment of the invention; and

FIG. 5 is a section view taken along line 5—5 of FIG. 4.

DESCRIPTION OF THE PREFERRED EMBODIMENTS

With particular reference to the drawings, a tiller 1 includes a handle 2 which is part of an overall tiller frame 3. An engine 4 transmits rotary motion to a tine assembly 6 through gear box 7 and belt drive 8. The tiller is movable on wheels 9. Control lever 11 is operatively connected to the belt drive to provide means for selectively interrupting and completing the power connection between the engine and the gear box.

The components described to this point, in one form or another, are generally included in a tiller arrangement of this type and their basic operation is well known to those skilled in this art. In general terms, to operate the tiller engine 4 is started through manipulation of pull cord 12. Control lever 11 is moved to complete the power drive between the engine and gear box and through the gear box to the tine assembly. The tine assembly rotates clockwise as viewed in the drawings and the tiller is moved forward on wheels 9 with the tines rotating to produce the tilling operation.

The particular tiller constructed in accordance with this invention is markedly reduced in size as compared to heretofore available tillers. As an example of the reduction in size which is achieved, engine 4 is a 2 horsepower engine and the overall weight of the tiller is approximately 50 pounds. This reduced size results in a tiller which can be readily hand manipulated, need not be self-propelled, and can be manufactured at a relatively economical cost. This places the tiller well within the reach of the homeowner and the casual, amateur gardener both from a cost and operational standpoint.

It is the structural arrangement and design of the various tiller components and their interaction which permits this reduced size without loss of operational effectiveness or efficiency.

More specifically, frame 3 has a principal handle extension 13 and a forked end 14 consisting of diverging legs 16 and 17. This attributes a generally Y-shape to the overall frame with leg 16 extending generally horizontal. It will be noted that frame 3 consists of two such Y-shaped portions each containing the elements just described and, where possible, the same identifying numerals have been applied to corresponding elements as between the two frame sections so that this description can be read on both.

With particular reference to FIGS. 2 and 3, gear box 7 is provided with two oppositely directed flanges 18 and 19. Angle brackets 21 and 22 are attached to legs 16 of the frame in any conventional manner such as spot welding. It will be noted that legs 16 are generally L-shaped in cross section along their marginal edge to better accommodate the angle brackets.

The engine 4 includes mounting flanges 23 and 24 projecting from opposite sides of the engine. Openings are provided in the engine mounting flanges, the angle bracket and in the legs 16. These openings all register when the components are arranged as illustrated in the drawings so that a common set of mounting hardware can be used to interconnect the frame, engine, and gear box into a unitary assembly. In the preferred embodiment, angle brackets 21 and 22 are provided with tapped holes and bolts 26 screw into those holes to complete the assembly.

To complete the overall structure, a tine shield 27 can be included in the tiller and also sandwiched in the assembly between the engine flanges and horizontal legs 16 and connected by bolts 26.

With the just described assembly, the frame 3 provides a central basic point of attachment for the structural elements and subassemblies of the tiller. The engine and gear box flanges rest atop the horizontal legs 16 with the gear box flanges being sandwiched between those legs and the engine, this substantially reduces the number of structural parts required by making optimum usage of those which are provided.

Optimum load bearing characteristics of the basic structural frame elements are achieved by utilizing a one-piece forked main frame having legs 16 and 17 joined by a relatively broad connecting web 28 integral with those legs. Stated another way, the integral broad web attributes a generally delta shape to the end of the frame. The basic frame elements are thus provided without the need for mechanically joined parts, for example weld connected elements.

More specifically, the relatively broad web 28 forms the juncture between legs 16 and 17 and extends into and forms a part of said legs. The web, together with the relatively broad nature of the legs 16 and 17 themselves, all in the same vertical plane, provides the basic structural element for bearing the load of the engine, the gear box, and the tine assembly. As is illustrated in FIGS. 1, 2, and 3, the handle 13 also includes a vertical planar portion which is also coplanar with the web and the portions of legs 16 and 17 formed by the web. The horizontal leg 16 can be viewed much in the nature of a cantilever beam and the loading is actually on that leg and the juncture between the legs 16 and 17. By providing the relatively broad planar web disposed in a vertical plane and generally parallel to the applied load (i.e. the weight of the elements attached to leg 16) increased loading capability in a relatively small and lightweight frame is achieved. All of the basic structural components of the tiller are supported from the basic frame without additional reinforcing or connecting members and the like.

The tiller described in connection with FIGS. 1–3 is generally referred to as a horizontal tiller. This is because the engine crank shaft extends horizontally. Vertical tillers are also made and sold and an example of a vertical tiller which also incorporates this invention is illustrated in FIGS. 4 and 5. The vertical tiller designation results from the fact that the crank shaft of engine extends vertically.

Basic to the vertical tiller is a frame 3', identical to the frame 3 of the embodiment of FIGS. 1–3. Prime numbers will be utilized in describing the frame of the vertical tiller to better correlate the descriptions of the two disclosed embodiments.

Frame 3' includes a principal extension 13' and a forked end 14' consisting of legs 16' and 17'. A generally broad web 28' is provided at the juncture between forked legs 16' and 17' and is in a generally vertical plane.

The vertical tiller includes an engine 31, a tine assembly 32 and a gear box 33. In the vertical tiller, the gear box is arranged vertically and the belt drive 30 horizontally, in contrast to the horizontal tiller where the horizontal and vertical relationships of the gear box and belt drive were reversed.

Again, the frame 3' is made up of two identical spaced sections as in the FIGS. 1–3.

All of the major components, and the load resulting therefrom, of the vertical tiller are carried on horizontal legs 16', the same as in the horizontal tiller. In this embodiment, this is accomplished by mounting engine 31 directly above legs 16'. The actual connection is made through a belt drive housing 34. That housing is made up of a lower U-shaped in cross section pan 36 and an upper dished cover 37. The engine is bolted to cover 37 and its drive shaft extends through an opening 38 in the cover. The pan 36 includes horizontal flanges 39 and 40 projecting outwardly and a web-like base 41 which rests on, and is preferably spot welded to, the upper surfaces of horizontal legs 16'. A pair of brackets 42 and 43 are spot welded to the underside of base 41 and the gear box housing sandwiched between those brackets and connected to the brackets by nuts and bolts 45. This basic structural arrangement of parts places the entire structural load on horizontal legs 16' the same as in the horizontal tiller thereby achieving all of the structural advantages flowing from that basic arrangement and the frame construction to thereby permit a compact and relatively simple interconnection of the engine and gear box to the frame.

Although this invention has been illustrated and described in connection with particular embodiments thereof, it will be apparent to those skilled in the art that various changes and modifications may be made therein without departing from the spirit of the invention or from the scope of the appended claims.

I claim:

1. A tiller comprising, in combination,
a frame having, as a one-piece structure, a vertically extending handle portion and a forked end, said handle portion including a generally vertical planar portion,
said forked end including a generally horizontal leg, a generally vertical leg and a planar web portion forming the juncture between said horizontal and vertical legs and also forming a vertical planar extension of said horizontal and vertical legs,
said planar handle, vertical leg, horizontal leg and web portions being coplanar,
an engine,
a gear box operatively connected to and driven by said engine,
a tine assembly operatively connected to and supported by said gear box and driven through said gear box,
means connecting said engine and gear box to said horizontal leg for supporting the load of said engine, gear box and tine assembly on said horizontal leg,
and wheels connected to said vertical leg.

2. A tiller comprising, in combination,
a frame having a vertically extending handle portion and, as a one-piece structure including said handle portion, a forked end including a generally horizontal leg and a generally vertical leg,
an engine including a flange located above said horizontal leg,
a gear box operatively connected to and driven by said engine, said gear box including a flange located above said horizontal leg,
a tine assembly operatively connected to and supported by said gear box and driven through said gear box,
and connecting means comprising bolt means extending through and connecting said engine flange, said gear box flange and said horizontal leg into mutual engagement with each other so that the load of said engine, gear box, and tine assembly is supported on said horizontal leg,
and wheels connected to said vertical leg.

3. The tiller of claim 2 wherein said gear box flange is located between said engine flange and said horizontal leg.

4. A tiller comprising, in combination, a frame having a vertically extending handle portion and, as a one-piece structure including said handle portion, a forked end including a generally horizontal leg and a generally vertical leg, an engine including a flange located above said horizontal leg, a gear box operatively connected to and driven by said engine, said gear box including a flange located above said horizontal leg, a tine assembly operatively connected to and supported by said gear box and driven through said gear box, connecting means comprising bolt means extending through and connecting said engine flange, said gear box flange, and said horizontal leg in mutual engagement, so that the load of said engine, gear box, and tine assembly is supported on said horizontal leg, said forked end having a planar web portion arranged in a vertical plane, said web portion and horizontal and vertical legs being in one-piece and said web portion forming the juncture between said horizontal and vertical legs and also forming a vertical planar extension making up a portion of said horizontal leg, and wheel means connected to said vertical leg.

5. The tiller of claim 4 wherein said gear box flange is located between said engine flange and said horizontal leg.

6. The tiller of claim 4 wherein said connecting means includes a pan having a portion located above and connected to said horizontal leg, said pan thereby forming an extension of said horizontal leg, said gear box connected to said pan, and said engine located above said horizontal leg.

7. The tiller of claim 6 wherein said engine is connected to said horizontal leg through said pan.

8. A tiller comprising, in combination, first and second frame sections each having, as a one-piece structure, a vertically extending handle portion and a forked end, said handle portion including a generally vertical planar portion, said forked end including a generally horizontal leg, a generally vertical leg and a planar web portion forming the juncture between said horizontal and vertical legs and also forming a vertical planar extension of said horizontal and vertical legs, said planar handle, vertical leg, horizontal leg and web portions being coplanar, said frame sections being horizontally spaced relative to each other, an engine, a gear box operatively connected to said engine and driven thereby, a tine assembly operatively connected to and supported by said gear box and driven through said gear box, means connecting said engine and gear box to said horizontal legs and generally centered relative to said horizontal legs in a horizontal plane for supporting the load of said engine, gear box, and tine assembly on said horizontal legs, and wheels connected to said vertical legs.

* * * * *